(12) United States Patent
Rodite

(10) Patent No.: US 6,181,812 B1
(45) Date of Patent: *Jan. 30, 2001

(54) TWO-PASS DOCUMENT IMAGE PROCESSING METHOD AND SYSTEM

(75) Inventor: Robert R. R. Rodite, Charlotte, NC (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 08/478,172

(22) Filed: Jun. 7, 1995

Related U.S. Application Data

(60) Division of application No. 08/076,504, filed on Jun. 14, 1993, which is a continuation-in-part of application No. 07/732,014, filed on Jul. 18, 1991, now abandoned.

(51) Int. Cl.[7] .................................................. G06K 9/00
(52) U.S. Cl. ............................................................ 382/135
(58) Field of Search .................................... 382/100, 119, 382/135, 181, 282; 235/454, 449, 471, 432; 902/5, 6

(56) References Cited

U.S. PATENT DOCUMENTS 4,523,330 * 6/1985 Cain ..................................... 382/135

* cited by examiner

Primary Examiner—Jose L. Couso
(74) Attorney, Agent, or Firm—A. P. Tennent

(57) ABSTRACT

Disclosed is a system for processing documents in a two pass arrangement. During the first pass, an image is stored along with a digital image signature relating to a portion of said image. On the second pass the image signature is compared with stored image signatures seeking a unique match. If that unique match is found, the associated record stored is used for controlling the function of the document processing system, for example, printing an amount field or sorting the document into a selected sorter pocket.

9 Claims, 3 Drawing Sheets

FIG. 3

| Seq. No. | R/T Code | Account | Amount | Image Signature |
|---|---|---|---|---|
| 454 | 0201093S6 | 761000149 | 4000 | 0111 0110 1101 |
| 455 | 027734567 | 002111222 | 1000 | 1100 1001 1110 |
| 456 | 0201093S6 | 001777666 | 5000 | 1011 1110 1011 |
| 457 | 0201093S6 | 001777666 | 10000 | 1100 0011 1100 |

TWO-PASS DOCUMENT IMAGE PROCESSING METHOD AND SYSTEM

CROSS REFERENCE TO RELATED APPLICATION

This is a Div of Ser. No. 08/076,504 filed Jun. 14, 1993 which is a continuation-in-part of application Ser. No. 07/732,014 filed on Jul. 18, 1991 now abandoned.

BACKGROUND OF THE INVENTION

1. Field of invention

This invention relates generally to systems and methods for processing documents such as bank checks and/or remittance documents. More particularly, the present invention relates to a system of processing documents using image processing.

2. Description of the Prior Art

High speed document processors are known which read documents, such as checks or remittance coupons, and, based upon the information read, control a subsequent processing operation on that document such as sorting it into a selected one of the plurality of pockets. Document processing of checks is discussed in the IBM Publications "Check Processing: Issues and Trends", GE20-0685-2 (3rd Ed., 6/84), and "IBM ImagePlus High Performance Transaction System (HPTS)", G520-6742-00 (1990), which are specifically incorporated herein by reference.

Conventionally, the document processing involves obtaining all the necessary machine readable information from that document as it is read during a single passage through a document processor from an input hopper to an output (sometimes referred to as a "single pass"), and using that information to determine in which pocket the check is to be sorted. An example of such a system is shown in U.S. Pat. No. 4,260,879 to Galatha, et al and assigned to IBM. In some cases some or all of this information is incomplete or missing.

Recently several techniques relating to using digital image for document processing have been proposed. These systems, including U.S. Pat. Nos. 4,205,780, 4,264,808 and 4,813,077, relate to the storage and processing of digital images in conjunction with conventional document processors.

Each of these systems has the disadvantage that if some of the machine-readable data from the document is missing or unreadable, that document cannot be processed and must be rejected. Then, later, some further processing of that document is necessary. The lack of machine-readable data could occur, for example, if a portion of a routing-and-transit field were not readable or if the document were not inscribed with an amount field, and processing was based on such field.

SUMMARY OF THE INVENTION

The present invention overcomes the limitations and disadvantages of the prior art system by providing a system in which each document is imaged and the image is stored for future use even if no data is readable from the document to allow processing (e.g., sorting) at that time. Thereafter, necessary data is obtained from the image and stored in association with the document. On a subsequent pass of that document, the data that has been stored in association with that document can be retrieved and used to process the document, as by sorting it or by inscribing it with an amount field.

The present invention has the advantageous effect that a part of the useful information from the document can be captured and stored in a record during a first pass, then missing information added from the stored image later. The added missing information is then included in a stored record associated with the document for use in subsequent readings of the same document.

The adding of additional information from the image means that images can be moved electronically to an operator, avoiding the need for moving paper documents from the transport to an operator. This allows the operator to be located in a different building, or even many miles away from the transport.

The present system makes magnetic character readers (MICR systems) and optical character readers (OCR systems) optional in a document processing system. Some or all of the information necessary for processing a document in the present invention is developed from a captured digital image of the document.

Accordingly, the present invention overcomes the limitations and disadvantages of the prior art system.

BRIEF DESCRIPTION OF THE DRAWINGS

Further advantages and uses of this invention will be apparent when considered in view of the following description and drawings, in which:

FIG. 3 is an example of portions of a table of record storage created by the document processing invention as output from the logic of FIGS. 2A and 2B.

DETAILED DESCRIPTION OF THE PREFERRED EMBODIMENT

Figure 1:
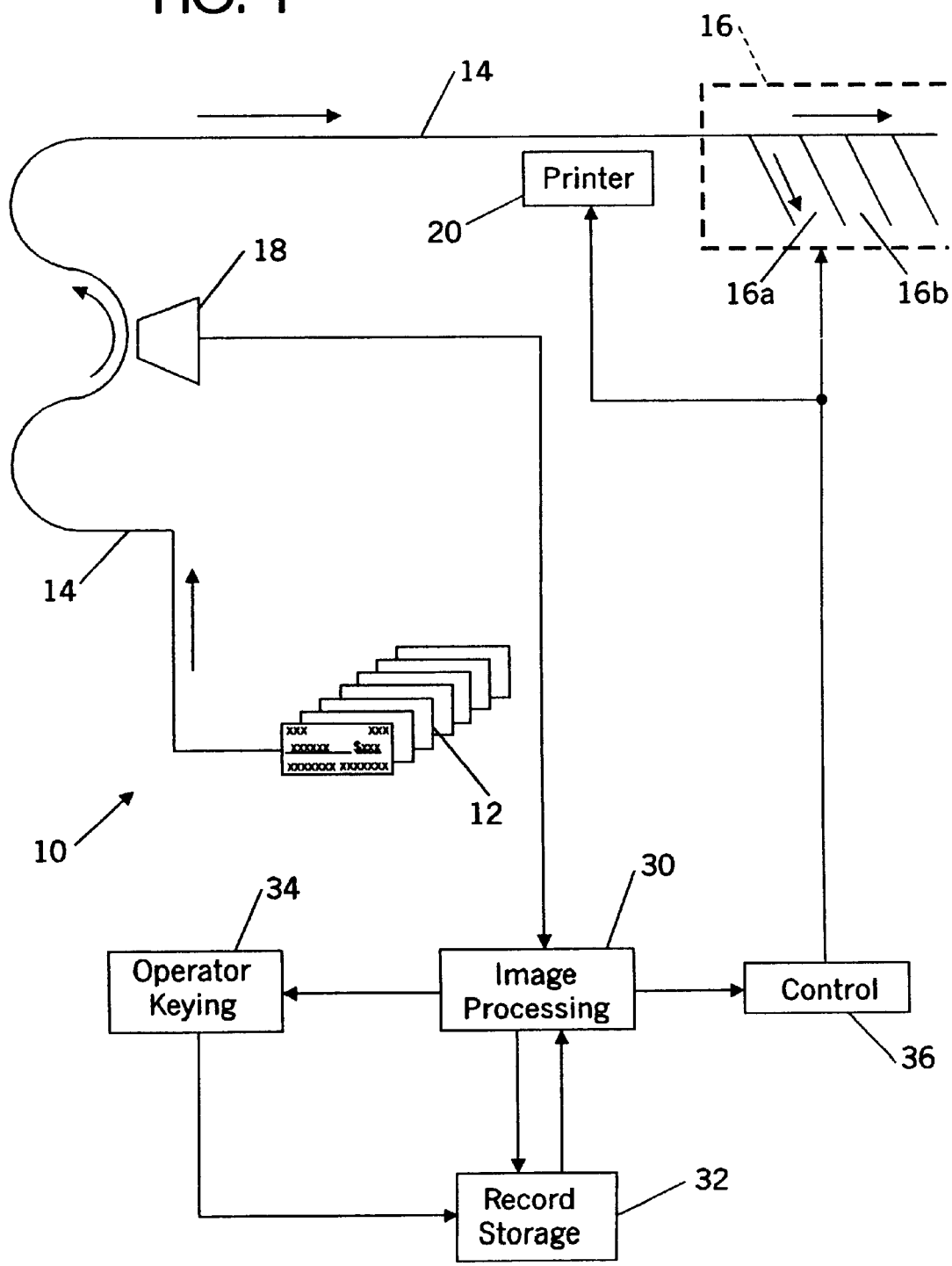
FIG. 1 is a schematic view of the document processing system of the present invention.

In FIG. 1, a document processor 10 is shown in schematic form. Documents from an input hopper 12 are transported along a transport path 14 to a pocket assembly 16 which includes individual pockets 16a, 16b, . . . As used herein, the term "document" includes those documents which have been modified by including a repair strip or insertion in a carrier or had additional information printed thereon, as well as those which are not so modified.

Located along the transport path 14 is an image camera 18 and a printer 20. An image processing system 30 is coupled to the image camera 18 to receive and process images from the camera 18 in a conventional manner. In connection with this, reference is made to the prior U.S. Pat. No. 4,888,812 entitled "DOCUMENT IMAGE PROCESSING SYSTEM" to Dinan, et al., the specification of which is hereby incorporated herein by reference as an indication of one such conventional image processing system suitable for the image processing block 30.

Coupled to the image processing 30 is a record storage 32 for storing records from the image system. Block 34 is a station entitled, "OPERATOR KEYING", where an operator reviews an image of the document being processed and manually enters items, such as an amount field or an account number, which were not already in the record.

It should be understood that conventional processors frequently include an apparatus for automatically reading a portion of a document. For example, although it is not shown, the document processor may include a magnetic read head for reading and storing so called MICR characters or an optical character reader (OCR) system for recognizing characters in either a predetermined font or from handwriting. To the extent that such system exists and is successful in recognizing some or all of the characters or other indicia on a document, the operator keying may not be necessary or may serve only as a verification of the information read, a completion of information which was not read, or a validation where the information is uncertain or ambiguous.

In any event, the image processing 30 is coupled to a record storage 32 where important information from each document, for example, see FIG. 3, is stored for each document processed. This information is augmented by the keying for each document from the block 34.

After the information has been stored in the record storage 32, that information can be retrieved and used at the control block 36. The block 36 is coupled to the pocket assembly 16 and/or to the printer 20. In this manner, information which has been recorded by an operator keying in block 34 could be used to inscribe (or place an amount field) in a predetermined location on the document by printer 20 as the document passes along the transport path 14. Alternatively, the entire code line could be printed on the document or on a repair strip or document carrier.

Alternatively, based upon information from the record storage 32 as controlled by the control block 36, the document could be sorted into an appropriate selected pocket (e.g., pocket 16a) of the pocket assembly 16. Such printing functions and such sorting functions are conventional, once the information is available and associated with the respective document.

Figure 2A:
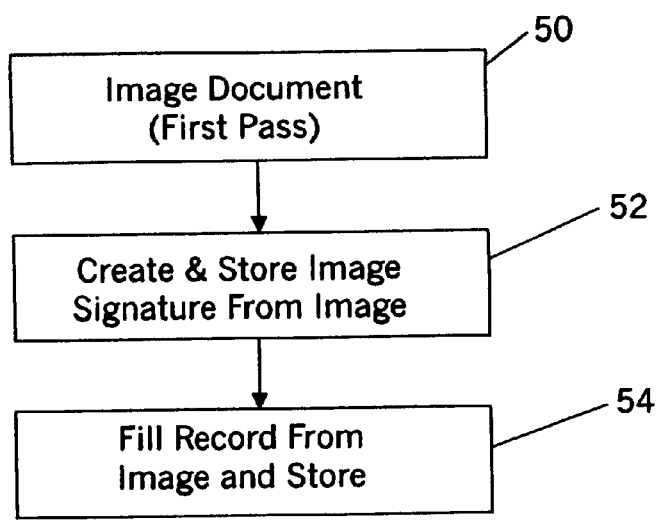
FIGS. 2A and 2B are block diagrams of the logic of the present invention.

FIG. 2A shows in block diagram form, the processing of a document as a result of its initial or first pass. At block 50, the document is imaged and that image is stored. At block 52, an image signature for each document is created and stored for each document. Enough of the image is sampled to create a unique signature to identify this document later. At block 54, a record for each image is created, and any fields which are not already available are completed, as by operator keying from the block 34 in FIG. 1. This record is then stored in the record storage of 32 of FIG. 1.

The simplest method of creating the image signature is to take X successive image locations from a selected area of the document. This area might be the signature line or the payee line of the document—an area which is unique from one document to the next.

Alternatively, the image signature could be created by an image histogram of a unique, relevant portion of the document or by a Fourier transform of the portion. For an illustration of the application of a histogram to document processing, see U.S. Pat. No. 4,590,606 to G. D. Rohrer entitled "Multi-Function Image Processing System", the specification of which is hereby incorporated by reference.

The important feature of the image signature is that it is unique to the document and that it is repeatable (each time the document is read, the same image signature is generated.)

Figure 2B:
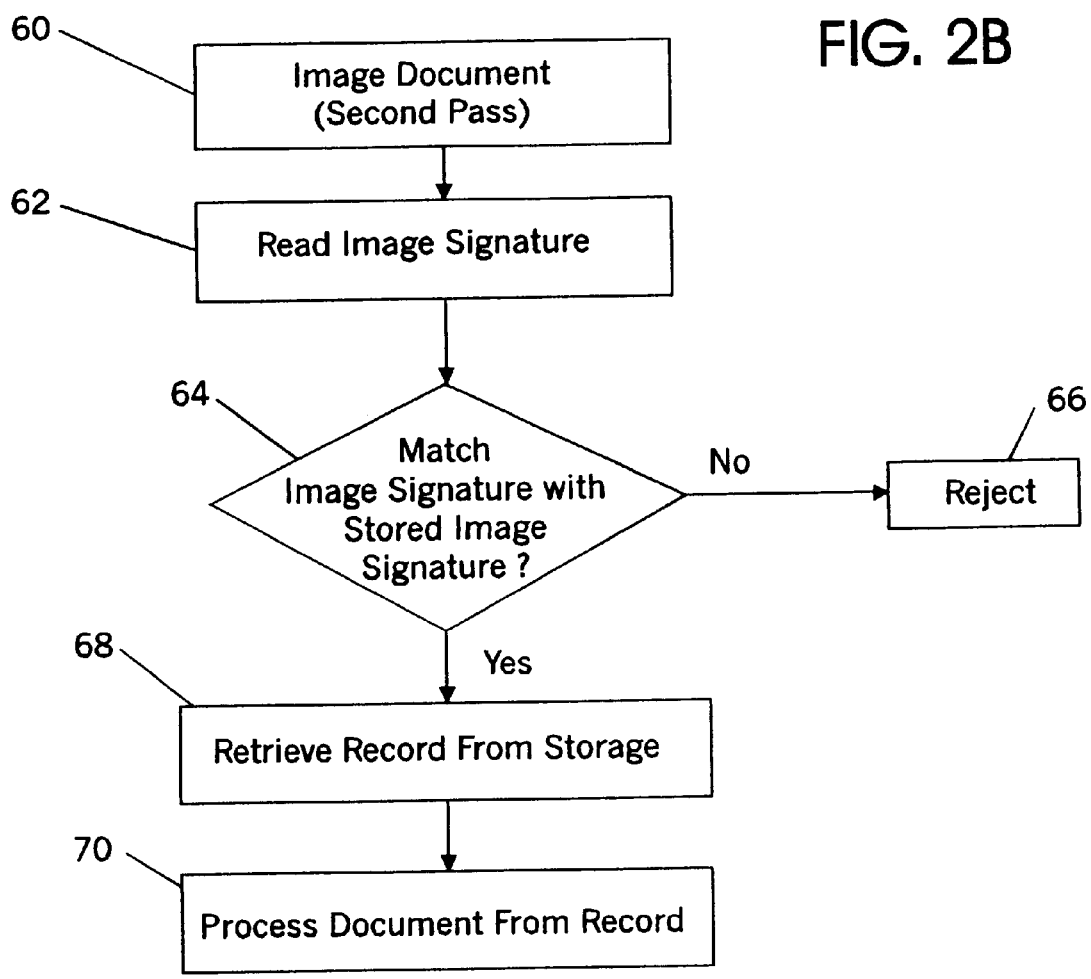

Referring now to FIG. 2B, after placing selected documents located in the pocket assembly 16 into the input hopper 12, a document is imaged at block 60 for its second pass or second trip through the document processor 10. Typically, the selected documents are manually placed into the input hopper 12, although they may also be automatically placed into the hopper. At block 62 the image signature is read and at block 64 an attempt is made to uniquely match that image signature with one of the stored images in the record storage 32. If it is not possible to uniquely match the image signature with a stored image signature, then no further processing is possible at this point and the document is considered a reject at block 66. However, if a unique image signature has been identified from the stored image signatures and matched with the current image signature, an associated record is retrieved from the record storage 32 of FIG. 1 at block 68. At block 70, the document is then processed from the record which has been retrieved from block 68. In this way, a document for which no amount field had been stored can be entered by operator keying in block 34 and that keyed amount included in the record storage 32 for the associated record associated with that document. On the second pass, that keyed amount field is retrieved based upon identifying the image signature and matching it with a stored image signature from the first pass and that amount could then be passed to the printer 20 for inscribing the document with the amount field in the appropriate location as it passes the printer 20 along the transport path 14. Alternatively, if the account number or transit code had not been read automatically, that account number or transit field would be keyed at the operator keying block 34 of FIG. 1 and later recovered when the image signature is matched at block 64 and the account number or transit field associated with the document during the second pass. This account number or routing-and-transit field then is used for example to control the sorting of the document into the appropriate pocket assembly.

FIG. 3 illustrates selected portions of the record storage for each of several documents to illustrate the present invention. The record storage is a table including all of the important information necessary to process the document. In the case of a bank check, this information would include the routing-and-transit field (the "R/T code") identifying the bank on which it is drawn, the account number, the amount field, etc. Also shown in this table are a sequence number for each document and the image signature which has been created and stored in conjunction with each document as described above.

If the processing of the document having sequence number 455 did not have a readable amount field, that column in the record storage is left blank. Similarly, if the routing-and-transit code for sequence number 456 was unreadable, that column in the record storage would be left blank. Then, after the image is stored, the missing information is entered by an operator at a computer terminal, keying the information from a displayed image of the relevant document.

The image signature column shows twelve binary bits for each document for the purpose of illustration. In practice, signature would be longer, perhaps five or ten times as large or larger. Further if the image is captured as a grey scale image, storage of the image signature in grey scale is appropriate.

Of course, many modifications and adaptations of the invention described in connection with the preferred embodiment could be made without departing from the spirit of the invention. Further, some of the features could be used without the corresponding use of other features. For example, in place of operator keying of missing information, an off-line optical character recognition system could be used. Alternatively, an operator verify system might be used in conjunction with characters which are read but are of questionable veracity. Further, the documents being identified might be compared with prestored form documents (such as a remittance document from merchant X) to identify the location of information rather than the stored version of the same document. The image signature and the image itself have been assumed to be digital images, but one or both presumably could be stored in analog form, if desired. Additionally, the record storage for a document could be completed by referring to a document and using its sequence number in place of referring to the image of the document. Finally, other types of image signatures could be created and used to advantage. Accordingly, the foregoing description should be considered as merely illustrative of the principles of the present invention and not in limitation thereof.

Having thus described the invention, what is claimed is:

1. A document processing system comprising:

a document transport system for transporting a document past an image camera;

an image processing system coupled to said image camera for generating and storing an image and an image signature, wherein said image signature is created from at least some portion of said image, for each document in a record storage;

means for completing a record for each document including information associated with indicia on each document, said means coupled to receive an image from the image processing system and to update the record storage;

means for reading a document on a second pass through the document processing system and for associating an image signature read from that document with an image signature previously stored in the record storage; and means coupled to the document transport system for further processing the document using information from the record of such associated document.

2. A document processing system of the type described in claim 1 where the means for further processing includes a printer for printing information from the stored record on the document.

3. A method of processing documents comprising the steps of:

storing an image and an image signature, wherein said image signature is created from at least some portion of said image, from each document during a first pass of the document through a document processor;

storing a record including indicia from each document during the first pass with each record corresponding to an image signature;

augmenting the stored record after the first pass based upon information from the image;

reading an image signature from each document during a second pass of the document through the document processor;

attempting to match uniquely the image signature from each document during the second pass with the image signatures stored during the first pass;

recalling the stored and augmented record corresponding to the matched image signature for the document when the image signature from the second pass matches the image signature stored during the first pass; and using the recalled stored and augmented record for controlling the processing.

4. The method of processing documents described in claim 3 wherein the step of using the recalled stored and augmented information for controlling the processing of the document during the second pass includes the step of selecting a sorter pocket for said document during the second pass.

5. The method of processing documents described in claim 3 wherein the step of using the recalled stored and augmented information for controlling the processing of the document during the second pass includes printing on said document a portion of said recalled stored and augmented record during the second pass.

6. The method of processing documents described in claim 5 where the step of printing includes identifying an amount field on said document as stored in the recalled stored and augmented record and printing the amount field in a predetermined location on said document.

7. The method of processing documents described in claim 3 wherein the step of augmenting the stored record includes displaying at least a portion of the stored image of the document to an operator and receiving an input from the operator for inclusion in the stored record.

8. A method of processing documents comprising the steps of:

storing an image and an image signature, wherein said image signature is created from at least some portion of said image, from each document during a first pass of the document through a document processor;

storing a record including indicia from each document during the first pass with each record corresponding to an image signature;

augmenting the stored record after the first pass based upon information from the document;

reading an image signature from each document during a second pass of the document through the document processor;

attempting to match uniquely the image signature from each document during the second pass with the image signatures stored during the first pass;

recalling the stored and augmented record corresponding to the matched image signature for the document when the image signature from the second pass matches the image signature stored during the first pass; and using the recalled stored and augmented record for controlling the processing.

9. A method of processing documents comprising the steps of:

reading an image signature, wherein said image signature is created from at least some portion of an image, from each document during a pass of the document through a document processor;

attempting to match uniquely the image signature from each document during the pass with a previously stored image signature;

recalling a stored record corresponding to the matched image signature for the document when the image signature from the pass matches the previously stored image signature; and printing information from the stored record on the document.

* * * * *